United States Patent Office 3,694,259
Patented Sept. 26, 1972

3,694,259
WELDING ELECTRODE
Philip J. Chapman, West Hill, Ontario, Canada, assignor to Liquid Carbonic Canadian Corporation Limited, Scarborough, Ontario, Canada
No Drawing. Filed Apr. 13, 1970, Ser. No. 28,116
Int. Cl. B23k 35/36
U.S. Cl. 117—206　　　　　　　　　　　　　4 Claims

ABSTRACT OF THE DISCLOSURE

A welding electrode coating composition containing, as a gellant, "Benaqua" beneficiated bentonite. The gellant facilitates the extrusion of the coating onto the metal core of the electrode. On baking the extruded coating is characterized by absence of porosity, cracking, splitting and chipping, or flaking off.

---

This invention relates to the manufacture of welding electrodes.

Such electrodes are made up of a core of metal onto which there has been extruded a relatively thick layer of a coating made up of various materials required in the welding operation and of which the components may vary widely. For example, a typical formulation may contain alkali metal and/or alkaline earth metal carbonates (functioning to produce carbon dioxide gas and to form slag), iron powder (providing added weld material), ferro alloys (acting as deoxidizers and/or alloying agents), fluorides (functioning as slag modifiers), and other materials. Frequently included in these formulations is a gelling agent or gellant to facilitate, among other things, extrusion of the wet mixture onto the electrode core. The gellant imparts lubricity to the mix without which extrusion can be difficult. The various slipping agents conventionally used, for example, alginates or gums or gum-like materials, and clays of various types have both good and bad properties. Most suffer from the disadvantage that they are sparingly dispersible in aqueous media. They tend to swell during the baking operation and this causes the coating to be porous and also can promote cracking and splitting. Further, the porosity imparts fragility to the baked coating, frequently leading to chipping or flaking off when the electrodes are being handled or used.

The applicants have now found that by employing as a gellant, in electrode coating compositions, a beneficiated bentonite sold by National Lead Company in the United States and in Canada by Enelchem Products, a Division of Canadian Titanium Pigments Limited under the trademark "Benaqua," the good qualities of previous gellants are obtained and at the same time their shortcomings are avoided. The exact nature of the beneficiated bentonite is not known, but the product is readily identifiable and available on the market, primarily as a thixotropic agent for paints.

One aspect of the invention is, therefore, an electrode composition having the characteristics described above. Another aspect is the use of such a composition in a process of making an electrode. A further aspect is in the resulting electrode made up of a core wire of a suitable metal, depending upon the welding job to be accomplished and an adherent coating as defined herein.

Generally speaking, the invention applies to any electrode coating whose manufacture normally employs a gellant. The gellant of the present invention can be used to replace in whole or in part, the relatively expensive alginate and other gum-like materials which have previously been used to provide adequate lubricity to electrode coating compositions. Such gum-like materials have previously been used, on occasion, to supplement bentonite or other clay-like materials, because the latter did not, alone, provide adequate lubricity in the coating composition. Using "Benaqua" as a gellant, according to the present invention, neither bentonite nor other clay-like material, nor gum-like material is necessary, since the highly beneficiated bentonite of the present invention, of itself, furnishes the lubricity and other properties for which the other materials, i.e. clays and/or alginates, have previously been included.

This gellant may be employed similarly to other gellants with the usual electrode coating formulation. A typical formulation may contain, for example, about 40% alkaline carbonates, that is calcium or magnesium carbonates (functioning to produce carbon dioxide gas and to form slag), 35% iron powder (providing added weld material), 10% ferro alloy (acting as a deoxidizer), 10% fluoride (functioning as slag modifiers). There may be other constituents as well.

According to the invention, a wet coating mixture is made up of the various constituents accompanied by "Benaqua" preferably in an amount of from about ½% to about 1½% of the composition on a solids basis (i.e. by dry weight). The coating mixture is extruded onto the core wire and the resulting coated wire baked. The baking temperature may range from about 250° F. to about 850° F. for varying lengths of time, for example, from about ¾ of an hour to about 1½ hours.

The invention makes possible faster heating rates; hence faster travel through the continuous baking ovens, thereby permitting higher extrusion and production rates. Closer contacts of electrodes in the early baking stages, and hence again faster extrusion rates, are both possible due to the easier moisture release, reducing swelling, and lower cracking sensitivity of coatings containing "Benaqua." A most valuable benefit is the greatly reduced fragility of the finished baked coating when "Benaqua" is substituted for other gellants.

The gellant "Benaqua" beneficiated bentonite of the invention, wets and disperses readily in an aqueous medium (soluble alkaline silicates) whereas other materials such as the alginates, gums, and in fact other types of beneficiated bentonites, given the same mixing techniques (preblending of the powdered gel formers with other powdered coating ingredients, followed by the addition of the liquid silicates) are only partially wetted and dispersed only sparingly in the liquid phase. In fact, the beneficiated bentonite gellant of the invention behaves as if almost completely wetted at this stage, whereas other materials are only partially so, the balance of the dispersion and wetting process being delayed, with the other agents, until exposure of the heating cycle. The wetting and dispersal process in all cases results in the formation of the gel structure, and is accompanied by swelling of the mass. This swelling when occurring in any great degree during baking, produces the undesired cracking, and reduced density of the coating with resulting fragility.

The coatings of the invention are denser than most prior coatings, in the sense that they inflate less and develop less internal porosity with a given baking condition. Thus there is produced a less fragile, or stronger, coating less likely to fracture when handled as a finished product.

There is visible improvement in arc smoothness when welding with electrodes made with this material over welding with electrodes having previous coatings of the same constitution except for the gellant attributed to the denser coating of the electrode of the invention. Low density or porosity in the coating appears to make its contribution to some degree of arc instability, probably, through the mechanism of irregular melting of flux materials and interruptions of ion emission.

Cracks, as referred to herein, are those that occur during the baking process due to the wet mechanical strength being too low to withstand the stresses set up by shrinkage and/or expansion during baking. All coatings upon extrusion are quite weak, but as dehydration progresses, strength increases rapidly. Because the electrodes are side by side as they pass through the baking ovens, often in contact with neighbouring ones, the top and bottom faces of the coating tend to be dried faster than the sides. This condition sets up surface shrinkage on tops and bottoms, putting the sides in tension, hence there is a good probability of cracking.

Conditions such as permeability of the coating to moisture loss, shrinkage or swelling tendency, the chemistry of the silicate binders, the rate of heating, the humidity conditions of the drying air, wet strength of the coating, and proximity of neighbouring electrodes, all play a role in the cracking phenomenon. The gellant used in the present invention contributes sufficient betterment to several of these factors to keep process cracking to a minimum.

The cracking associated with fracturing of the dry coating is a different parameter and is related to the coatings ability to withstand shock. Density is a factor in determining the structural strength of the dry coating, as are other things such as particle nature, size and shape, nature of the dried silicate, and degree of bond between coating and core wire.

"Disperse" is used herein to define the dispersal of the gellant in the aqueous solution, which implies wetting and colloid formation, which is incomparably more readily achieved with the gellant of the invention than with other gellants. This should not be confused with distribution of the gellant throughout the mix at large. In the latter case, distribution is uniform by virtue of the mixing tecrniques employed, but with other gellant materials there is a much more pronounced condition of localized unwet or partially wetted particles, and thus only part of the potential total gel formation available.

"Benaqua" is described in the sales literature as a mineral thickener for water systems and is mainly for use in paints. It is fine powder in flake form, usually buff colored. It wets and disperses easily in water at room temperature using low shear stirring techniques. When fully dispersed the gellant flakes break down into colloidal particles and form a unique aqueous gel structure. The gellant forms a gel in water without the need for higher shear equipment, hot water or special pre-gelled masterbatch preparation. Unlike most organic gelling agents, the gellant is not subject to microbiological degradation.

In composition it is a highly beneficiated hydrous magnesium silicate having a specific gravity of about 2.4, an apparent density (lbs./gal.) 4±1, and moisture (percent) 4±2.

The gel in water is extremely smooth and non-grainy because after dispersion, the ultimate particle of the gellant is a minute flake with an average maximum dimension of less than one-tenth of a micron. The gel is stable with respect to both time and temperature, and highly reproducible. The gels are quite thixotropic. They will break down under shear, with rapid recovery of viscosity after removal of the shear force.

While the manner of use of the gellant of the invention, with various electrode coating compositions, will be clear to those skilled in the art, the following examples of typical compositions are given by way of specific illustration, but not in a limiting sense.

EXAMPLE I

A coating mixture comprising about 30% rutile, 35% iron powder, 3% alkaline carbonates, 15% mineral silicates, 3% deoxidizers as ferrous alloy powders, 10% soluble silicate binders and about ½% "Benaqua" make up the finished electrode of which the coating weight accounts for 40% of the total and the steel core wire the balance.

The coating mixture is extruded onto the core wire and the resulting coated wire gradually raised in temperature over a period of about 35 minutes to a final baking temperature of 400–500° F. to arrive at the desired finished working properties of the electrode.

EXAMPLE II

A coating mixture comprising about 25% alkaline carbonates, 20% of a fluoride, 25% iron powder, 9% deoxidizers as ferrous alloy powders, 5% rutile, 8% soluble silicate binders and about 1% "Benaqua," in which the finished electrode comprises about 35% of this mixture and 65% steel core wire.

The coating mixture is extruded onto the core wire and the resulting coated wire raised in temperature over a period of about 45 minutes to 800–900° F. to produce the finished usable electrode.

I claim:
1. In a welding electrode,
a core of metal,
provided with a coating made up of electrode coating substances and including a gellant,
said composition having been extruded onto the core in the form of a pasty mass to form the coating and baked in situ to harden the coating,
the improvement in which the gellant employed is "Benaqua" beneficiated bentonite and the coating is characterized by high density and absence of cracking said gellant being a highly beneficiated hydrous magnesium silicate having a specific gravity of about 2.4, and apparent density of (lbs./gal.) of 4±1 and moisture (percent) 4±2, being a thickener for water systems in the form of minute flakes with an average maximum dimension of less than one-tenth of a micron, wetting and dispersing easily in water at room temperature using low shear stirring techniques, when fully dispersed by low shear stirring the gellant flakes breaking down into colloidal particles to form an aqueous thixotropic gel structure stable both as to time and temperature, the gel breaking down under shear with rapid recovery of viscosity after removal of the shear force, the gellant being employed in an amount of from about ½% to about 1½% of the composition on a solid basis.
2. In a composition for coating electrodes,
electrode coating substances and incluing a gellant,
the improvement in which the gellant employed is "Benaqua" beneficiated bentonite as an agent providing the composition with extruding lubricity and the capacity of being baked to form a dense coating characterized by absence of cracking said gellant being a highly beneficiated hydrous magnesium silicate having a specific gravity of about 2.4, an apparent density of (lbs./gal.) of 4±1 and moisture (percent) 4±2, being a thickener for water systems in the form of minute flakes with an average maximum dimension of less than one-tenth of a micron, wetting and dispersing easily in water at room temperature using low shear stirring techniques, when fully dispersed by low shear stirring the gellant flakes breaking down into colloidal particles to form an aqueous thixotropic gel structure stable both as to time and temperature, the gel breaking down under shear with rapid recovery of viscosity after removal of the shear force, the gellant being employed in an amount of from about ½% to about 1½% of the composition on a solid basis.
3. In a process of making an electrode comprising forming a wet extrudable composition of electrode coating providing substances and including a gellant,
extruding the composition onto a metal core as a coating, baking the electrode, thus formed to convert the coating into a hard mass, the improvement in which "Benaqua" beneficiated bentonite is employed as a gellant to improve the lubricity of the composition, to increase the density of the coating and to reduce the tendency of the baked coating to crack said gellant being a highly beneficiated hydrous magnesium silicate having a specific gravity of about 2.4, an apparent density of (lbs./gal.) of 4±1 and moisture (percent) 4±2, being a thickener for water systems in the form of minute flakes with an average maximum dimension of less than one-tenth of a micron, wetting and dispersing easily in water at room temperature using low shear stirring techniques, when fully dispersed by low shear stirring the gelalnt flakes breaking down into colloidal particles to form an aqueous thixotropic gel structure stable both as to time and temperature, the gel breaking down under shear with rapid recovery of viscosity after removal of the shear force, the gellant being employed in an amount of from about ½% to about 1½% of the composition on a solid basis.

4. A process, as defined in claim 3 in which the baking is at a temperature within the range from about 250° F. to about 850° F. for a time from about ¾ of an hour to about 1½ hours.

References Cited

UNITED STATES PATENTS

| 3,394,238 | 7/1968 | Wilcox | 117—202 X |
| 3,463,676 | 8/1969 | Higgins | 148—22 |

FOREIGN PATENTS

| 563,251 | 9/1958 | Canada | 117—202 |

RALPH S. KENDALL, Primary Examiner

U.S. Cl. X.R.

117—202, 205, 207; 148—26